United States Patent Office 3,809,772
Patented May 7, 1974

3,809,772
PROCESS FOR PREPARING A FOOD ADJUNCT FROM COLLAGEN
Howard W. Jones, 49 Pawnee Road, New Britain Borough, Bucks County, Pa., and Robert A. Whitmore, 705 E. Mermaid Lane, Philadelphia, Pa. 19118
No Drawing. Original application Feb. 27, 1970, Ser. No. 15,304. Divided and this application Jan. 5, 1971, Ser. No. 104,173
Int. Cl. A23j 1/10, 3/00
U.S. Cl. 426—364    1 Claim

ABSTRACT OF THE DISCLOSURE

Collagen is made stable to heat and water deformation by treatment with glyceraldehyde. The collagen can be treated by mixing glyceraldehyde into a collagen dispersion or by immersing it in an aqueous solution of glyceraldehyde at a temperature of from 0 to 40° C. The concentration of glyceraldehyde varies with the density of the collagen being treated, the length of time the collagen is immersed in the glyceraldehyde and the temperature of the glyceraldehyde.

---

A nonexclusive, irrevocable, royalty-free license in the invention herein described, throughout the world for all purposes of the United States Government, with the power to grant sublicenses for such purposes, is hereby granted to the Government of the United States of America.

This application is a division of application Ser. No. 153,304 filed Feb. 27, 1970 which in turn in a continuation of application Ser. No. 759,793 filed Sept. 13, 1968, both now abandoned.

This invention relates to the stabilization of collagen preparations. More particularly, the present invention is concerned with making collagen prepartions resistant to heat and water deformation, thereby making collagen a useful food adjunct as a coating, binder or extender.

Collagen, a proteinaceous substance found in all animal tissues to some degree but chiefly in the white connective tissue such as the skin, bones, tendon, facia and teeth, has long been employed as raw material in the preparation of leathers and articles such as sponges, films, fibers, etc. It is eaten in meat products and as a gelatin and with the exception of tryptophan, which is found only in low concentrations, it contains about one-half the level of essential amino acids found in lean beef.

The traditional uses for collagen is leather, glue and gelatin are seriously threatened by commercially available substitutes. However, the availability of these substitutes will not reduce the supply of collagen because in order to assure a continuing supply of meat, cattle will still be raised on the grasslands of the world. Since the market for collagen in making leathers and other products may be drastically reduced by such substitutes, it is important to find other uses for this proteinaceous material.

Dispersions of collagen from animal sources have been tanned or fixed to obtain products that were somewhat satisfactory such as sausage and frankfurter casings and sutures. Alum and formaldehyde tannages are not considered very satisfactory for the preparation of sausage casings of food products because of their toxicity. Other usual tannages are even less satisfactory from the toxicity standpoint and consequently one would not expect any large-scale food use of collagen treated with conventional tanning agents.

One object of the present invention is to produce a stable collagen preparation that can be used as a food adjunct.

Another object of this invention is to produce a collagen product that will not shrink unduly when cooked.

A further object of this invention is to provide a collagen preparation which when it is used as a casing and filled with an edible meat product, will survive without breaking or undue shrinkage when cooked.

A still further object of this invention is to achieve the above objects by treating collagen from animal sources with non-toxic materials.

According to the present invention collagen is rendered stable to heat and water deformation by treatment with glyceraldehyde.

At pH 2 to 4, glyceraldehyde may be added directly to a collagen dispersion having a protein concentration in water of between 1 and 35%. Between 1° and 100° C., glyceraldehyde is effective as a stabilizer at concentrations of 2 to 6% and above on a dry protein basis and may be used as the pure dimer or monomer or as supplied commercially, that is, a 10 to 40% solution in water. The commercially supplied solution contains, in the aqueous portion, substances such as unconverted reagents and by-products of the manufacture of the glyceraldehyde. However, these substances were found to be nontoxic and to have no stabilizing action. With the exception of crystalline d,1-glyceraldehyde, the commercially available aqueous solution (about 40%) was used in the development of this invention.

The collagen dispersion may also be treated by dipping or bathing it in an aqueous solution of glyceraldehyde. In this case it is necessary to limit the temperature to a range (0–40° C.) in which the untreated, unreacted dispersion holds its shape during treatment. The pH of the bath is usually between 4.0 and 8.0 depending on the original pH of the collagen dispersion and the final pH desired in the body mixture or film of collagen. For food purposes, the final pH should preferably be between 5.5 and 7.5, but it can range from about 3.5 and 8.5. The concentration of glyceraldehyde present in the bath depends on the thickness and density of the collagen body or film, the length of time the collagen is in the bath and the temperature of the bath. The final glyceraldehyde content must be at least 2 to 6% of the dry collagen being treated.

When collagen is dispersed in an aqueous medium, the relatively impermeable fibers separate into fibrils which swell laterally. This swelling is greatly increased when the pH of the aqueous medium is near 3.3 or near 12.0. However, since both extreme of pH are outside the range generally allowable in food products, it is interesting to note that glyceraldehyde is more effective as a fixative at a pH level above 4.0.

When subjected to dry heat or boiling, collagen dispersions of 5–10% solids leave an undissolved residue which interferes with evaluation of stabilizing agents. Therefore, gelatin a completely soluble derivative of collagen is often used as a test substrate.

The following examples are given to illustrate the present invention but it is not to be construed that the invention is restricted to the details of these examples:

EXAMPLE I

A 40% solution of glyceralydehyde was added to a solution of gelatin at 40° C. Films prepared from the resulting solution became brown on drying and withstood boiling in water for five minutes.

EXAMPLE II

A dispersion of collagen was made by homogenizing 4% solids macerate of steer-hide flesh split at pH of 3.5. While the collagen dispersion was warm (about 40° C.), a 40% solution of glyceraldehyde was added to it. This mixture, if left at room temperature, set without additional auxiliary drying. When put into hot water, the mixture shrank and when brought to a boil it became tender, not gelatinous and held its form during long periods of boiling. Controls to which glyceraldehyde was not added fell apart before the boiling temperature was reached. A film of the above mixture cast on a glass plate and air-dried shrank on heating in water and on boiling became tough and rubbery but did not dissolve.

EXAMPLE III

A collagen dispersion containing 11% solids and having a pH of 4.5 was made by mixing and warming to about 40° C. in a blender. Fifty gram aliquots of the dispersion were mixed thoroughly while warm with 10 ml. of 40% glyceraldehyde solution. Portions of each aliquot were treated as follows: (1) frozen at 0° F.; (2) held at room temperature (70° F.); and (3) held at 104° F. for 60 hours. Upon heating these portions in water to the boiling temperature the following results were obtained: (1) held its form well, but was somewhat tough; (2) swelled superficially and had a somewhat tough gel remaining; (3) same as 2.

EXAMPLE IV 0.05 gm. of crystalline d,1-glyceraldehyde was mixed with 10 ml. of 10% warm (about 40° C.) gelatin solution and the mixture then cast in a 2" x 2" rectangular film on glass and dried. The film did not swell appreciably in cold water and retained its form for 1.5 hours in boiling water. The light tan color of the film darkened on boiling. Addition of the glyceraldehyde did not change the taste of the gelatin.

EXAMPLE V

The experiment was similar to Example IV except that 0.1 gm. of glyceraldehyde was used. The results were the same except that the film was a darker color.

EXAMPLE VI

To each of three 10 ml. aliquots of 10% warm (about 40° C.) gelatin solution having a pH of 4.1 were added 5.0, 1.0 and 0.5 ml. of 1% glyceraldehyde solution. Gels and dried films from each of the treated aliquots were boiled and fried.

Results are shown in the following table:

| Amount of 1% glyceraldehyde added, ml. | Glyceraldehyde on dried gelatin, percent | Effect of indicated treatment on gel and dried film | | | |
|---|---|---|---|---|---|
| | | Gel | | Dried film | |
| | | Boiled | Fried | Boiled | Fried |
| 5 | 5 | NC¹ | NC | NC | NC |
| 1 | 1 | M² | M | NC | NC |
| 0.5 | 0.5 | M | N | M | M |

¹ No change.  ² Melted.

EXAMPLE VII 20 g. of finely ground collagen material was placed in 80 ml. of water containing 10 ml. lactic acid and 2 ml. of 30% glyceraldehyde was added. This was mixed in the Waring Blender for about 1 minute, the resulting mixture heated to 75° C. and neutralized to pH 7.0 with 6 g. sodium bicarbonate.

Hamburger was coated with the resulting dispersion. When cooked either in a frying pan or in an oven, the film withstood the cooking temperatures without melting.

EXAMPLE VIII

To a dispersion containing 10 g. collagen solids per 200 ml. total volume was added 2.0 ml. of a 30% glyceraldehyde solution. To another dispersion of the same concentration no glyceraldehyde was added. The dispersions were heated to about 75° C. and neutralized with bicarbonate. Films were then made by spreading some of each of the dispersions on glass plates and allowing the layer of dispersion to dry. When the films were subjected to cooking temperatures the glyceraldehyde treated film did not change while that containing no glyceraldehyde melted.

EXAMPLE IX

Collagen from delimed steer hide was mixed with water and ice in a blender to make a dispersion containing 5% solids and having a pH of 4.3 and a temperature in the range of 0–15° C. This temperature range was maintained by keeping the dispersion in a refrigerated room. Three 100 ml. aliquots of the dispersion were treated as follows: (1) nothing was added, this was the control; (2) 1.0 ml. of 30% glyceraldehyde was added and mixed with this aliquot; (3) 1.0 g. of NaHCO₃ was added to make the pH of the aliquot 7.3 and then 1.0 ml. of 30% glyceraldehyde was added and mixed with the slightly alkaline dispersion. A portion of the control and of each of the treated aliquots was cast on glass and dried to a film at room temperature. The films were tested to determine the following characteristics: (1) Shrink temperature (Ts ° C.); (2) amount of shrinkage in boiling water; (3) ability to withstand boiling without disintegrating. The results are shown in the following table:

| Aliquot | Ts, ° C. | Shrinkage at 100° C., percent | Ability to withstand boiling water |
|---|---|---|---|
| 1 | 54 | 62 | Good. |
| 2 | 63 | 25 | Do. |
| 3 | 73 | 17 | Do. |

We claim:
1. A process for converting inedible steer hide into an edible food adjunct, comprising:
 (a) preparing a collagen dispersion by homogenizing the steer hide in an aqueous medium containing about 12.5% lactic acid by volume and about 2.5% of 30% glyceraldehyde by volume;
 (b) warming the collagen dispersion to about 75° C.; and
 (c) neutralizing the dispersion to pH 7.0.

References Cited

UNITED STATES PATENTS

| 3,446,633 | 5/1969 | Talty | 99—176 |
| 3,073,702 | 1/1963 | Keil | 99—169 |
| 3,297,459 | 1/1967 | Skokie | 106—161 |
| 3,433,864 | 3/1969 | Highberger | 264—202 |

OTHER REFERENCES

J. American Leather Chemists Association 57, pp. 581–588, November 1962, Milch.

Proc. Soc. Exp. Biol. III, pp. 551–556, Milch et al, December 1962.

Gerontologia, 7, pp. 129–152, Milch, 1963.

RAYMOND N. JONES, Primary Examiner

U.S. Cl. X.R.

426—92, 212, 105, 442, 224; 260—123.7